United States Patent
Ogino

(10) Patent No.: US 7,804,541 B2
(45) Date of Patent: Sep. 28, 2010

(54) IMAGE PICKUP APPARATUS

(75) Inventor: Yushi Ogino, Hyogo (JP)

(73) Assignee: Panasonic Corporation, Osaka (JP)

( * ) Notice: Subject to any disclaimer, the term of this patent is extended or adjusted under 35 U.S.C. 154(b) by 731 days.

(21) Appl. No.: 11/669,627

(22) Filed: Jan. 31, 2007

(65) Prior Publication Data

US 2007/0182839 A1    Aug. 9, 2007

(30) Foreign Application Priority Data

Feb. 3, 2006   (JP) .............................. 2006-027455

(51) Int. Cl.
  H04N 5/225   (2006.01)
  G03B 17/02   (2006.01)
(52) U.S. Cl. ........................ 348/373; 348/376; 396/535; 396/540
(58) Field of Classification Search ................ D16/200, D16/202
  See application file for complete search history.

(56) References Cited

U.S. PATENT DOCUMENTS 6,356,716 B1 *   3/2002   Itabashi et al. .............. 396/299
6,683,653 B1 *   1/2004   Miyake et al. ............... 348/373
7,355,649 B2 *   4/2008   Takai .......................... 348/372
7,463,288 B2 *  12/2008   Aoyama .................. 348/231.1
7,505,067 B2 *   3/2009   Ogawa et al. ........... 348/208.99
7,522,208 B2 *   4/2009   Shiohara ................. 348/333.06
2004/0165106 A1 *  8/2004   Nakagawa ................... 348/373

FOREIGN PATENT DOCUMENTS

JP    3631226    12/2004

* cited by examiner

Primary Examiner—Luong T Nguyen
(74) Attorney, Agent, or Firm—Hamre, Schumann, Mueller & Larson, P.C.

(57) ABSTRACT

An image pickup apparatus of the present invention includes a main body 1 incorporating an image pickup element, an operation part that is placed on the main body 1 and can be operated by a user, and a seventh surface 107 provided on the main body 1, on which, when the user takes a picture while holding the main body 1, the thumb of the hand holding the main body 1 can be left in a stand-by state. The operation part includes rotation operation parts that are placed in the vicinity of the seventh surface 107 and are rotatable, and the rotation operation parts are arranged so that at least a part of the same faces the seventh surface 107. With this, a movement amount of the fingers of the user is reduced, whereby the operability is improved.

6 Claims, 7 Drawing Sheets

IMAGE PICKUP APPARATUS

BACKGROUND OF THE INVENTION

1. Field of the Invention

The present invention relates to an image pickup apparatus such as a digital still camera.

2. Description of Related Art

In recent years, digital still cameras have been devised in which arrangements of operation parts such as buttons and levers are improved so that the operability thereof is improved.

For example, the patent document 1 (JP 3631226 B) discloses a configuration in which switches are arranged in a manner such that a user is allowed to operate them more easily. More specifically, as shown in FIGS. 5 and 6 of the patent document 1, in a video camera 100, a zoom switch 19*c* is arranged at a position such that the switch is operable with the index finger of a user, while a mode switching switch 19*a*, an image pickup start/stop switch 19*b*, and a joy stick 10 are arranged at positions such that these are operable with the thumb of the user. With this configuration, the switches can be operated with the index finger and the thumb.

However, the configuration disclosed in the patent document 1 has the following problem. When a user operates each switch, the finger of the user has to be moved to an upper portion of the switch, which increases the movement amount of the user's finger, thereby inhibiting a desired operation from being performed instantly. This impairs the operability.

SUMMARY OF THE INVENTION

It is an object of the present invention to provide an image pickup apparatus that involves a smaller movement amount of user's fingers, thereby enhancing the operability.

An image pickup apparatus of the present invention is an image pickup apparatus in which an optical image that has entered therein is picked up by an image pickup element and a video signal thereof is obtained, and the image pickup apparatus includes: a cabinet in which the image pickup element is placed; an operation part that is placed on the cabinet and can be operated by a user; a display part that is placed on a principal face of the cabinet and is capable of displaying a video image according to the video signal obtained by the image pickup element; and a contact part placed on the principal face of the cabinet, wherein when the user takes a picture while holding the cabinet, a thumb of a hand of the user is brought into contact with the contact part so that the user holds the cabinet. In the foregoing image pickup apparatus, the operation part includes a plurality of rotation operation parts that are placed in the vicinity of the contact part and are rotatable within a plane substantially parallel with the principal face, at least one of the plurality of rotation operation parts is arranged so that at least a part of the same faces the contact part, is rotatable through 360° or more, and is in a disk shape, and another of the plurality of rotation operation parts is arranged so that at least a part of the same faces the contact part, is rotatable through a predetermined angle, and has a projected portion that is projected toward the contact part side.

With the image pickup apparatus of the present invention, the operability can be improved.

DETAILED DESCRIPTION OF THE INVENTION

Embodiment 1

[1. Configuration of Image Pickup Apparatus]

Figure 1:
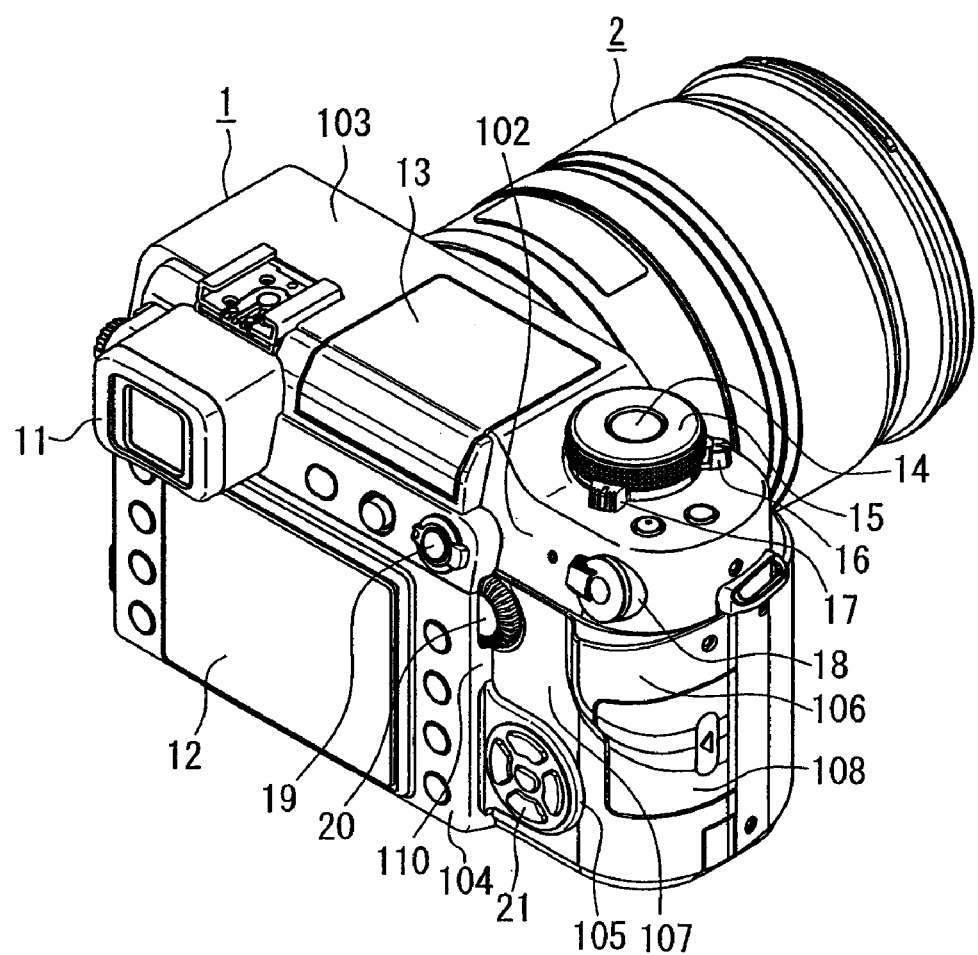
FIG. 1 is a perspective view illustrating an appearance of an image pickup apparatus according to Embodiment 1 of the present invention.
Figure 2:
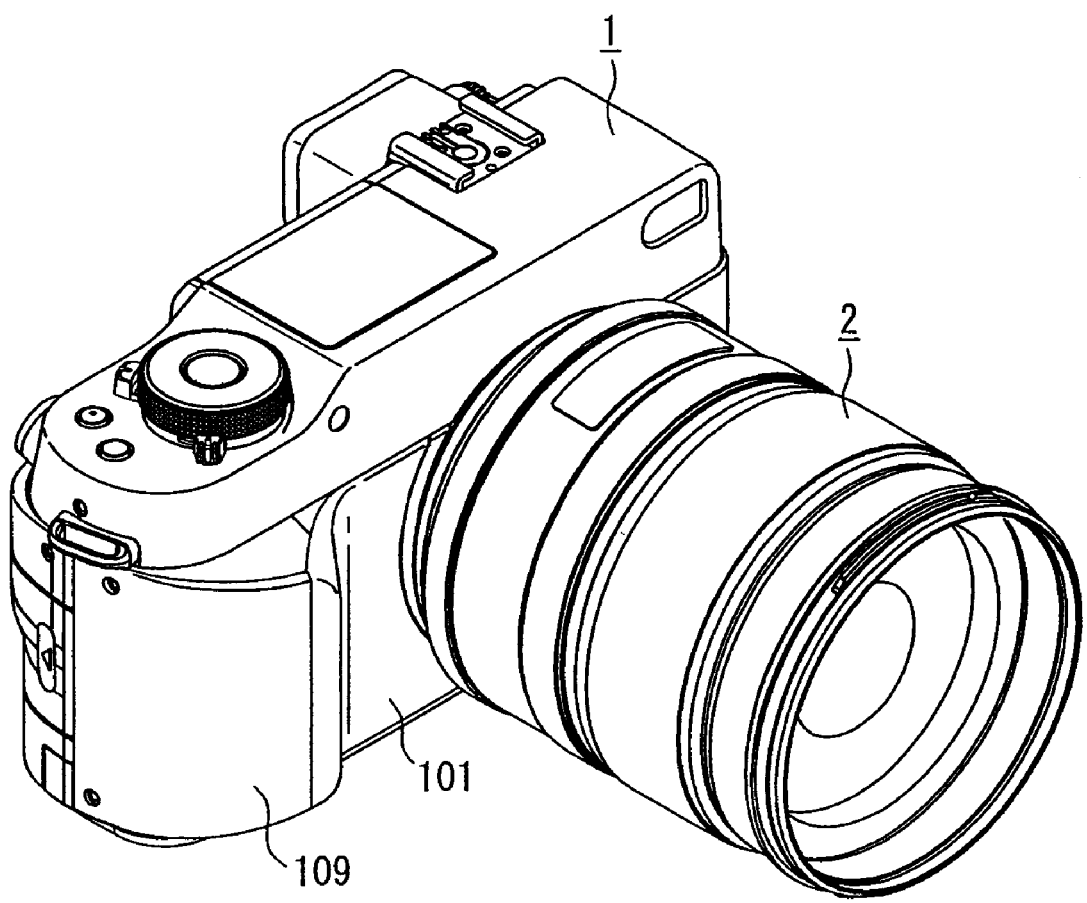
FIG. 2 is a perspective view of the image pickup apparatus according to Embodiment 1.
Figure 3:
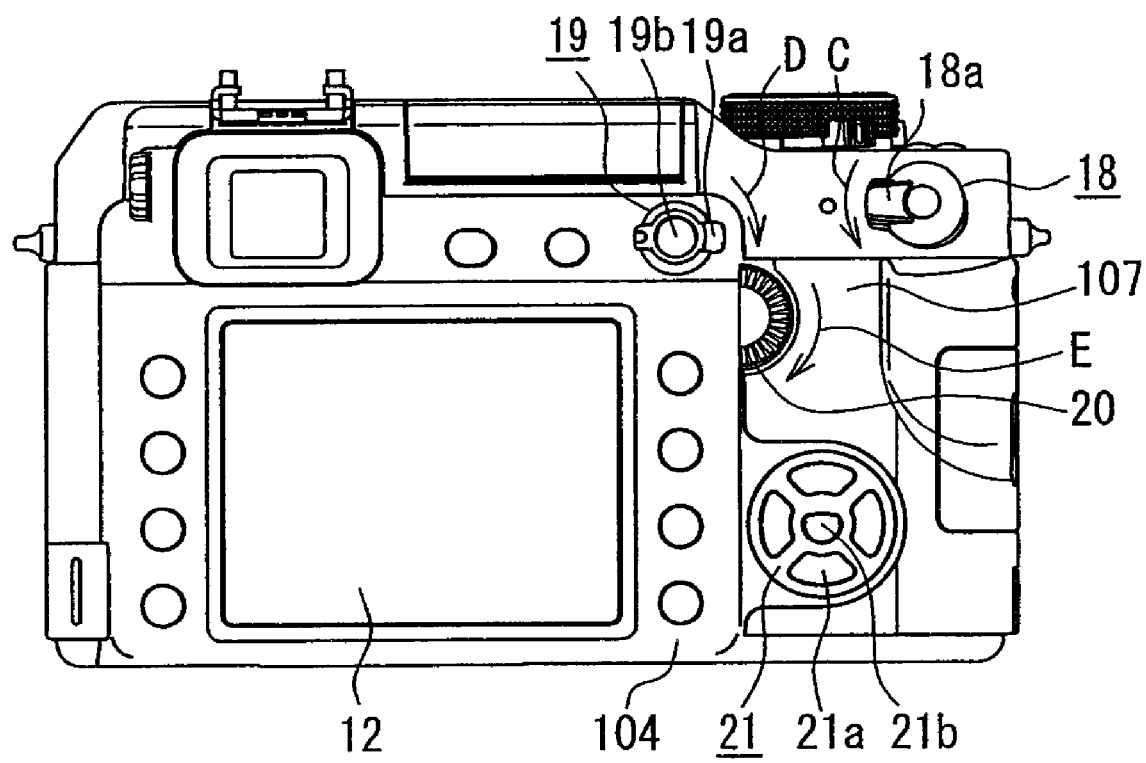
FIG. 3 is a side view of the image pickup apparatus according to Embodiment 1.

FIG. 1 is a perspective view of an image pickup apparatus according to Embodiment 1, which illustrates an appearance of the same viewed from the user side. FIG. 2 is a perspective view of the image pickup apparatus, which illustrates an appearance of the same viewed from a subject side. FIG. 3 is a side view of the image pickup apparatus, which illustrates the appearance of the same viewed from the user side. It should be noted that the present embodiment is described by referring to a digital single-lens reflex camera as an example of the image pickup apparatus as shown in the drawings.

As shown in FIG. 1, the image pickup apparatus principally is composed of a main body 1 and a lens barrel 2.

The main body 1 incorporates: an image pickup element that forms an optical image that entered through lenses in the lens barrel 2, converts the same to electric signals, and outputs the same; a signal processing circuit for generating video signals according to signals output from the image pickup element; an information medium in which video signals having been processed by the signal processing circuit are recorded, etc. When a user grasps the image pickup apparatus, usually he/she grasps the main body 1 with the right hand, and grasps the lens barrel 2 with the left hand.

The lens barrel 2 is fixed or detachable with respect to the main body 1, and incorporates a plurality of lenses such as a zoom lens and a focus lens. On a circumferential surface of the lens barrel 2, a zoom ring with which a zooming operation can be performed manually, and a focus ring with which a focusing operation can be performed manually, are arranged so as to be rotatable.

The main body 1 includes a finder 11, a liquid crystal monitor 12, a strobe light 13, a release button 14, a first switch 15, a second switch 16, a third switch 17, a power switch 18, a focus switch 19, a rotation switch 20, and a cursor key 21. Though other operation parts are provided in addition to those described above, descriptions of the same are omitted herein.

The finder 11 is configured so that an optical image can be recognized visually that has entered through the lenses in the lens barrel 2, has been reflected by mirrors along an optical axis of the main body 1, and has been reflected inside a pentagonal prism. It should be noted that since the present embodiment is described by referring to a digital single-lens reflex camera as an example, optical systems such as mirrors and prisms are incorporated in the main body 1, but in the case of a camera having a configuration other than the single-lens reflex configuration, the foregoing optical systems are omitted.

The liquid crystal monitor 12 is capable of displaying video images and various types of information. More specifically, the liquid crystal monitor 12 is capable of, when an image is picked up, displaying an image (so-called through image) generated by image formation by an image pickup element placed on an optical axis of the main body 1, and when an image is reproduced, displaying an image read out of an information medium such as a memory card placed in the main body 1. Besides, it also is capable of displaying necessary information when the image pickup apparatus is used, such as the zoom magnification, the f number, the battery level, and the number of pictures having been taken.

The strobe light 13 is placed on a top face (third surface 103 that will be described later) of the main body 1 so as to be retractable in the main body 1, and is capable of emitting fill light. In the present embodiment, it is retractable in the main body 1, but alternatively it may be exposed on a front face of the main body 1, for example.

The release button 14 is configured so that when it is pressed by a user, an image (e.g. a static image) picked up by the image pickup element can be recorded in an information medium. The release button 14 is configured so that a half-pressing operation and a full-pressing operation can be performed. The half-pressing operation causes an auto-focusing operation (details thereof will be described later) to be performed, while the full-pressing operation causes a picked up image to be captured.

Figure 4:
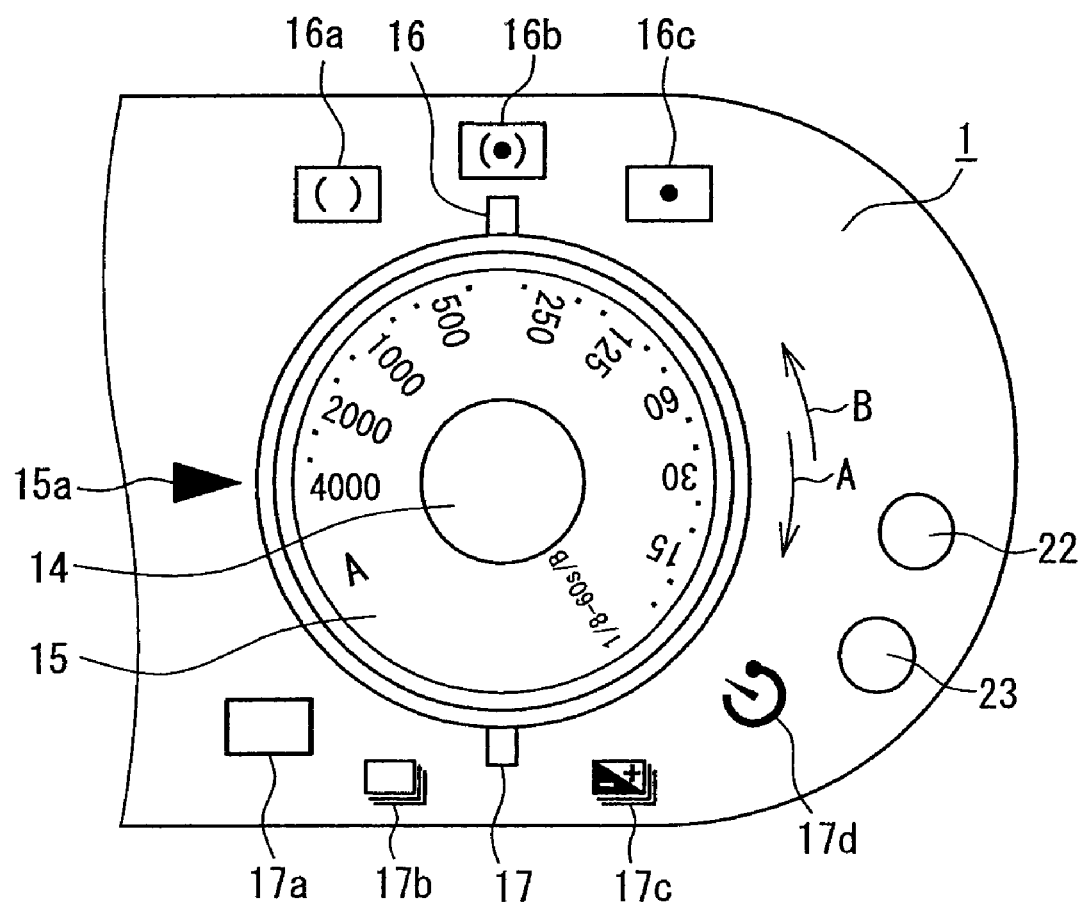
FIG. 4 is a plan view illustrating principal parts in the vicinity of a release button of the image pickup apparatus according Embodiment 1.

The first switch 15 is placed so as to be rotatable around the release button 14, and is used for setting the shutter speed. FIG. 4 is an enlarged plan view illustrating a configuration around the first switch 15. As shown in FIG. 4, numerical values indicating the shutter speed are shown on a surface of the first switch 15. The first switch 15 is configured so as to be rotatable in directions indicated by arrows A and B. The shutter speed can be set by rotating the first switch 15 in the foregoing directions so that a value corresponding to a desired shutter speed comes to the position of a mark 15*a*. It should be noted that among the values shown on the first switch 15, "4000", for example, indicates "$\frac{1}{4000}$ second", and "15" indicates "$\frac{1}{15}$ second". The setting of the shutter speed may be performed not only by operating the first switch 15 alone, but also by operating the same in combination with the rotation switch 20 (which will be described later).

The second switch 16 is arranged coaxially with the first switch 15, and is switchable in a direction indicated by the arrow A or in a direction indicated by the arrow B shown in FIG. 4. The second switch 16 is configured so that a light metering mode can be selected by turning a knob thereof to a mark indicating a desired mode. The second switch 16 is rotatable in a range such that the knob thereof is turned selectively to a mark 16*a*, 16*b*, or 16*c*. In the present embodiment, the light metering mode can be selected from "intelligent multiple metering" indicated by the mark 16*a*, "center weighted metering" indicated by the mark 16*b*, and "spot metering" indicated by the mark 16*c*. The "intelligent multiple metering" is a scheme of photometry such that the image pickup apparatus makes automatic photometric determination with respect to the entire frame so as to optimize exposure. The "center weighted metering" is a scheme of photometry such that the entire frame is subjected to a photometric operation generally, with a subject at the center of the frame being weighted. The "spot metering" is a scheme of photometry such that a subject on a spot metering target displayed at the center of the frame is subjected to a photometric operation.

The third switch 17 is arranged coaxially with the first switch 15 and the second switch 16, and is switchable in a direction indicated by the arrow A or in a direction indicated by the arrow B shown in FIG. 4. The third switch 17 is configured so that a drive mode such as single frame shooting mode and burst shooting mode can be selected by turning a knob thereof to a mark indicating a desired mode. The third switch 17 is rotatable in a range such that the knob thereof is turned selectively to a mark 17*a*, 17*b*, 17*c*, or 17*d*. In the present embodiment, the drive mode can be selected from "single frame shooting mode" indicated by the mark 17*a*, the "burst shooting mode" indicated by the mark 17*b*, "auto bracketing mode" indicated by the mark 17*c*, and "self-timer mode" indicated by the mark 17*d*. The "single frame shooting mode" is a mode such that one full-pressing operation with respect to the release button 14 causes one static image to be captured. The "burst shooting mode" is a mode such that one full-pressing operation with respect to the release button 14 causes a plurality of static images to be captured at predetermined time intervals (e.g. 0.5 second). The "auto bracketing mode" is a mode such that one full-pressing operation with respect to the release button 14 causes a plurality of images (e.g. 5 images) with different exposure levels to be captured, from which an image with a desired exposure level can be selected. The "self-timer mode" is a mode such that one full-pressing operation with respect to the release button 14 causes an internal timer to start timing, and an image picked up by the image pickup element is captured automatically when a preset time (e.g. 10 seconds) is timed.

As shown in FIG. 3, the power switch 18 (rotation operation part) is arranged so that at least a part of the same faces toward a seventh surface 107. The power switch 18 is arranged on the right side relative to the seventh surface 107 as viewed facing the seventh surface 107. The power switch 18 also is positioned at an upper right part of the main body 1, in a state that a principal face thereof is viewed in a usual way. The power switch 18 also is rotatable within a plane substantially parallel with the principal face of the main body 1. Further, the power switch 18 is configured to be rotatable through a predetermined angle in a direction indicated by an arrow C or in a reverse direction thereof, and when it is rotated, the power of the image pickup apparatus is turned on/off. The power switch 18 is provided with a knob 18*a* (projected portion) projected toward the seventh surface 107 (which will be described later) side. A user is allowed to make a rotating operation of the power switch 18 in the arrow C direction or the reverse direction with the thumb being engaged on the knob 18*a*. The knob 18*a* also is projected also in a direction substantially perpendicular to the seventh surface 107 so as to allow the user's thumb to be engaged thereon easily.

Herein the verb "face" implies a state in which an object concerned (e.g. a part of the power switch 18) is arranged so as to be oriented to a surface concerned (e.g. the seventh surface 107). The object concerned and the surface concerned may be arranged so as to face each other with a gap being provided therebetween, or may be arranged so as to face each other in contact with each other. Expressions such as "faces", "facing", etc. in the following description are defined as described above.

Besides, the "principal face of the main body 1" is a surface of the substantially rectangular parallelepiped main body 1 on which a second surface 102, a fourth surface 104, etc. are formed. In other words, the principal face of the main body 1 is a surface that faces a user during picture taking. The state of being "a principal face of the main body 1 is viewed in a usual way" is a state in which, when a user takes a picture with the main body 1, the user faces and views the principal face, with the apparatus being in a state in which the release button 14 is on the upper side of the main body 1.

The focus switch 19 (rotation operation part) is arranged so that at least a part of the same faces toward the seventh surface 107. The focus switch 19 also is arranged so as to be rotatable within a plane substantially parallel with the principal face of the main body 1. The focus switch 19 is arranged on the fourth surface 104, on the left side to the seventh surface 107 as viewed facing the seventh surface 107. The focus switch 19 is positioned at an upper right part of the main body 1 when the principal face of the main body 1 is viewed in a usual way. The focus switch 19 is configured so that a selection lever 19a is rotatable through a predetermined angle in a direction indicated by an arrow D or in a reverse direction thereof, and when it is rotated, the focus mode can be selected. A knob (projected portion) of the focus switch 19 is provided so as to be projected toward the seventh surface 107 side. A user is allowed to make a rotating operation with respect to the selection lever 19a in the arrow D direction or the reverse direction with the thumb being engaged on the knob. The knob of the selection lever 19a is projected also in a direction substantially perpendicular to the seventh surface 107 so as to allow the user's thumb to be engaged thereon easily. The focus modes that can be selected with use of the focus switch 19 include: "single auto focus (AFS)" such that only upon one half-pressing operation with respect to the release button 14, an operation of bringing a subject into focus is performed; "continuous auto focus (AFC)" such that with the release button 14 being pressed half, an operation of following a subject and bringing the same into focus is carried out; and "manual focus (MF)" such that a subject is brought into focus manually by rotating the focus ring that is rotatable around the lens barrel 1. Besides, by operating a lock button 19b arranged substantially at the center of the selection lever 19a, the state of AF (Auto Focus) and the state of AE (Auto Exposure) can be locked. In other words, by operating the lock button 19b after bringing a subject into focus by half-pressing the release button 14 as described above, the state of AF and the state of AE at that point in time can be maintained.

Figure 5:
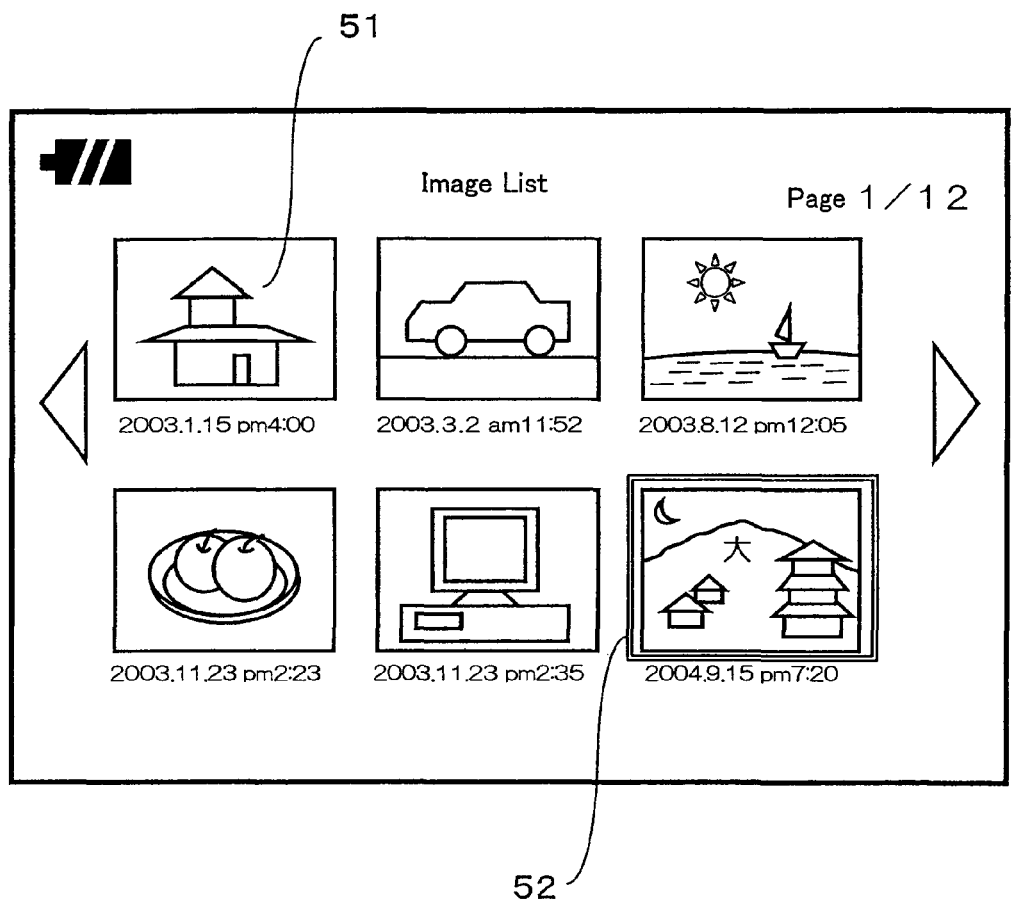
FIG. 5 is a schematic view illustrating thumbnail images.

The rotation switch 20 (rotation operation part) is formed in a disk form. Further, the rotation switch 20 is arranged so that at least a part of the face of the same faces the seventh surface 107. The rotation switch 20 also is rotatable within a plane substantially parallel with the principal face of the main body 1. Further, the rotation switch 20 can be rotated in a direction indicated by an arrow E or in a reverse direction thereof through 360° or more continuously. Still further, on a circumferential surface of the rotation switch 20, many projections and recesses are formed continuously in a circumferential direction so as to allow a user to operate the switch with the thumb. By making a rotating operation with respect to the rotation switch 20, a selection operation can be carried out on a menu screen displayed on the liquid crystal monitor 12, and a selection operation for selecting a desired image can be carried out on a thumbnail screen as shown in FIG. 5. It should be noted that FIG. 5 is a schematic diagram illustrating a state of display in which thumbnails of images recorded in an information medium (memory card, etc.) installed in the image pickup apparatus are displayed. As shown in FIG. 5, the thumbnail screen is configured so as to display a plurality (six in the present example) of thumbnail images 51a in one screen. By moving the cursor 52 to a desired thumbnail image, and for example, operating a decision button placed on the main body 1, an enlarged image of the image selected by the cursor 52 can be displayed on the liquid crystal monitor 12. The rotation switch 20 is rotated in the arrow E direction when the cursor 52 is moved, whereby the cursor 52 is operated so as to select the images in succession in the arranged order.

The cursor key 21 is composed of a cross key 21a that enables the selection of vertical and horizontal directions, and the decision button 21b arranged at the center of the cross key 21a. The cross key 21a allows operations similar to those with the rotation switch 20 to be performed. For example, a selection operation on the menu screen displayed on the liquid crystal monitor 12, a selection operation for selecting a desired image on the thumbnail screen as shown in FIG. 5 can be performed with the cross key 21a. The decision button 21 allows "decision" operations to be performed regarding various functions. For example, in the thumbnail display state as shown in FIG. 5, by operating the decision button 21b after selecting an image with use of the cross key 21a, an enlarged image of the selected image can be displayed.

Function switches 22 and 23 are arranged in the vicinity of the right side end of the second surface 102 of the main body 1.

It should be noted that the power switch 18, the focus switch 19, and the rotation switch 20 are included in the rotation operation parts, but the switches are not limited to those described above, and any switch can be provided as long as at least it is placed at a position facing the seventh surface 107 and can be rotated.

[2. Configuration of Cabinet]

The following describes a configuration of a cabinet of the main body 1.

The main body 1 is configured in a substantially rectangular parallelepiped shape as shown in FIGS. 1 and 2, and a grasp part that can be grasped by a user with the right hand has a curved surface to make the apparatus easily grasped.

In FIG. 2, a first surface 101 is a surface on which the lens barrel 2 is placed, and faces toward a subject during picture taking.

In FIG. 1, the second surface 102 faces the first surface 101, and the finder 11 and other various operation parts are arranged on the second surface 102. The second surface 102 faces toward a user during picture taking.

A third surface 103 is adjacent to the first surface 101 and the second surface 102 at their upper ends. The strobe light 13, the release button 14, the first switch 15, the second switch 16, the third switch 17 and the like are arranged on the third surface 103.

The fourth surface 104 is formed in a plane that is substantially parallel with the second surface 102 and is on an outer side relative to the second surface 102 in the normal direction of the plane. On the fourth surface 104, the liquid crystal monitor 12 and other various operation parts are arranged.

A fifth surface 105 is formed in a plane that is substantially parallel with the second surface 102 and is on an outer side relative to the second surface 102 in the normal direction of the plane. On the fifth surface 105, the cursor key 21 is placed.

A sixth surface 106 is formed bulgingly in a portion of the main body 1 that is to be grasped by a user with the right hand, and has a curved surface.

The seventh surface 107 (contact part), which is a part of the second surface 102, is a recessed surface surrounded by the fourth surface 104, the fifth surface 105, and the sixth surface 106. The seventh surface 107 is configured so that when a user grasps the main body 1 with the right hand during picture taking, the thumb of the right hand is positioned on the seventh surface 107.

An eighth surface 108 is a right-hand side face of the main body 1 as viewed in FIG. 1, and is a portion to be grasped by a user with the right hand during picture taking. The eighth surface 108 is composed of a curved surface so as to be grasped with the right hand easily.

A ninth surface 109 is equivalent to a bulge formed on the first surface 101 as shown in FIG. 2, and it is a portion that is to be grasped by a user with the fingers of the right hand other than the thumb during picture taking.

A tenth surface 110 is an oblong wall that crosses substantially orthogonally the fourth surface 104, the second surface 102, and the seventh surface 107. The tenth surface 110 is cut away partially so that about half of the rotation switch 20 is buried therein, with the other half of the rotation switch 20 being exposed.

[3. Operation of Image Pickup Apparatus]

[3-1. Grasping]

The following describes the state in which the image pickup apparatus is grasped.

Figure 6:
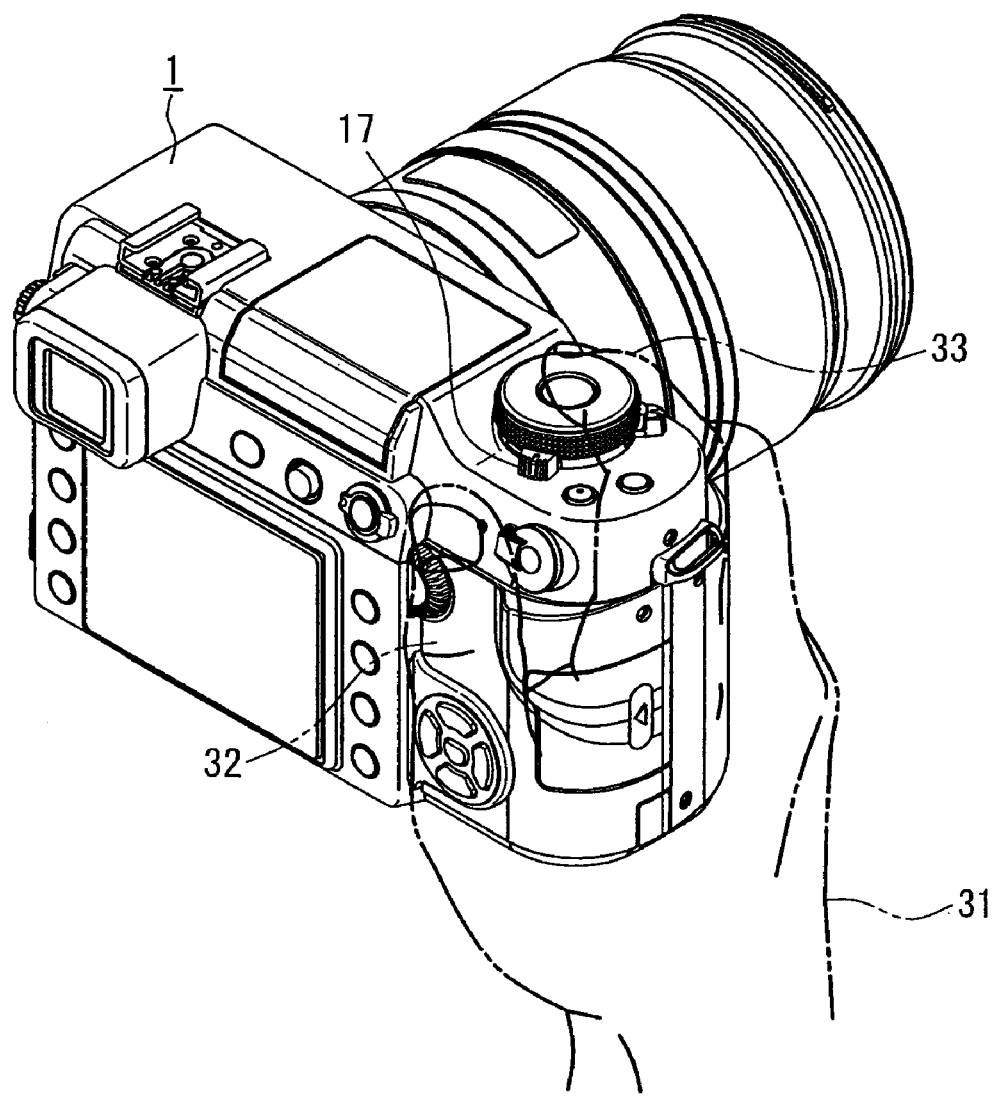
FIG. 6 is a perspective view of the image pickup apparatus grasped by a hand.
Figure 7:
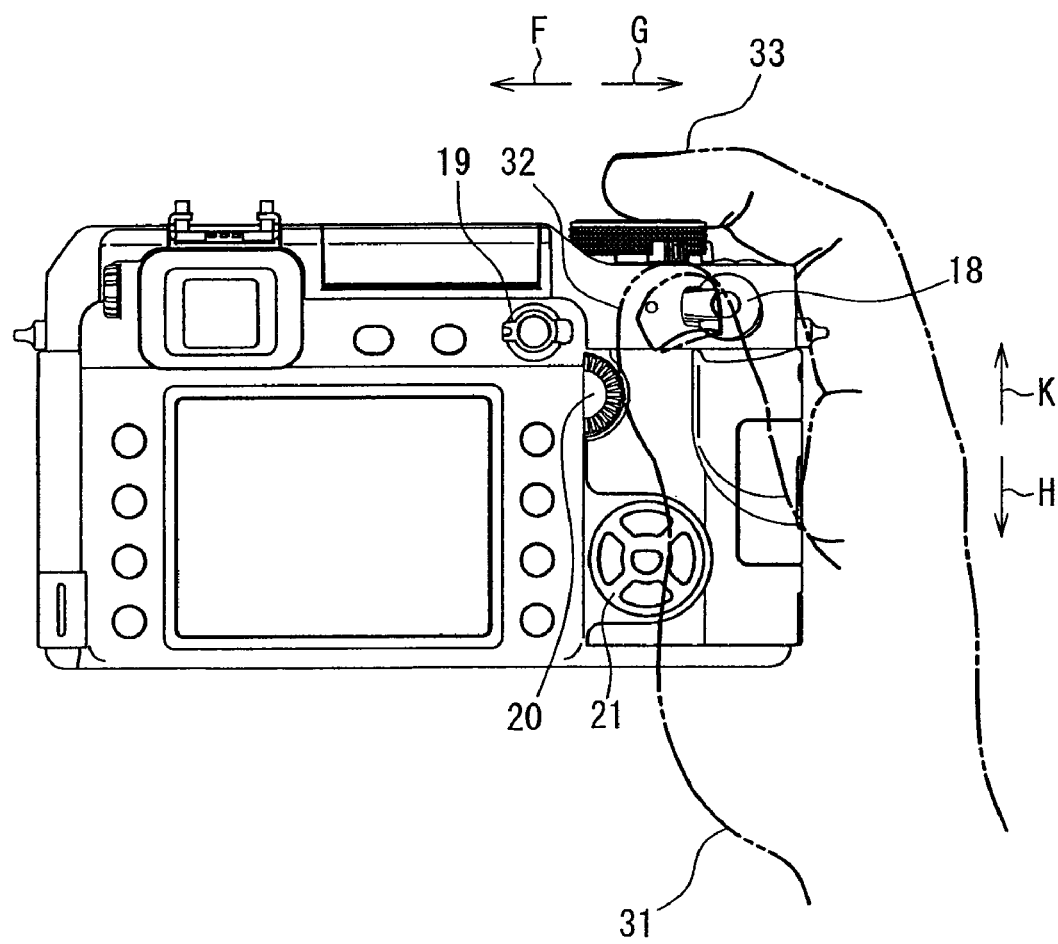
FIG. 7 is a perspective view of the image pickup apparatus grasped by a hand.

FIGS. 6 and 7 are perspective views illustrating a state in which a user grasps the main body 1 with the right hand. The user grasps a side part of the main body 1 (right side part as viewed from the user side) with the right hand 31, and supports the same at its bottom part with the left hand during picture taking, as shown in FIG. 6. By so doing, the user can get the image pickup apparatus ready in a stable state. Further, when a manual zooming operation or a manual focusing operation (MF) is carried out during picture taking, the rotation of the zoom ring or the focus ring arranged around the lens barrel 2 can be performed with the fingers of the left hand.

In the state shown in FIG. 6, the thumb 32 of the right hand 31 is positioned on the seventh surface 107 of the main body 1 (see FIG. 1). The right side part of the thumb 32 is in contact with or in the vicinity of an edge portion of the sixth surface 106, which bulges outward relative to the surface 107. Further, the left side part of the thumb 32 is in contact with or in the vicinity of the tenth surface 110 and the rotation switch 20. Still further, the thumb 32 also is in contact with or in the vicinity of an edge portion of the fifth surface 105. This configuration ensures that the thumb 32 is positioned on the seventh surface 107.

Besides, it is possible to position the fingertip of the index finger 33 of the right hand 31 on the release button 14 (see FIG. 1), so as to allow the index finger to operate an release operation. The middle finger, the ring finger, and the little finger (which are not shown) of the right hand 31 grasp the ninth surface 109, which bulges from the main body 1.

By arranging the fingers of the right hand on the main body 1 as described above, the main body 1 can be grasped stably. Particularly since the thumb 32 is positioned on the seventh surface 107 by the sixth surface 106 and the tenth surface 110, the main body can be grasped more stably.

The following describes operations with use of the index finger 31 and the thumb 32.

[3-2. Operation with the Thumb]

An operation with use of the thumb 32 is described first.

As shown in FIG. 7, in the case where the power of the image pickup apparatus is turned on/off in a state in which a user grasps the right side part of the main body 1 with the right hand 31, only a slight movement of the thumb 32 in a direction indicated by an arrow G from the position shown in FIG. 7 is required so that the thumb 32 reaches the knob 18a (see FIG. 3) of the power switch 18. It should be noted that the thumb 32 easily reaches the knob 18a since the knob 18a is projected toward the seventh surface 107 side. Next, the thumb 32 is engaged on the knob 18a to turn the same in a direction indicated by an arrow K or H (equivalent to the arrow C direction or the direction reverse to the same shown in FIG. 3), whereby the power switch 18 can be turned on/off.

To operate the focus switch 19, only a slight movement of the thumb 32 in a direction indicated by an arrow F from the position shown in FIG. 7 is required so that the thumb 32 reaches the selection lever 19a (see FIG. 3) of the focus switch 19. It should be noted that the thumb 32 easily reaches the selection lever 19a since the selection lever 19a is projected from the center of the focus switch 19 toward the seventh surface 107 side. Next, the thumb 32 is engaged on the selection lever 19a to turn the same in the arrow K direction or the arrow H direction, whereby the selection operation for selecting AFS/AFC/MF can be carried out. Then, the thumb 32 may be moved further in the arrow F direction onto the lock button 19b (see FIG. 3) so as to press the same, whereby an operation with respect to the lock button 19b can be carried out.

To operate the rotation switch 20, an operation of rotating the rotation switch 20 in the arrow K direction or the arrow H direction can be carried out by slightly moving the thumb 32 in the arrow F direction from the position shown in FIG. 7, or substantially without moving the same in the case where the thumb 32 already reaches the rotation switch 20. A rotation operation of the rotation switch 20 allows selection operations in various menus, setting operations for setting various values such as the shutter speed (in the case where a value that cannot be set with the first switch 15 is to be set) during picture taking, and an operation for selecting a desired image in a list of thumbnail images, etc. to be performed.

For example, the operation for selecting a thumbnail image is performed as shown in FIG. 5. FIG. 5 is a schematic view illustrating a state in which a list of images recorded in an information medium such as a memory card is displayed on the liquid crystal monitor 12. In FIG. 5, a plurality of reduced images 51 and information such as dates and times when the images were taken are displayed in the screen. Besides, the cursor 52 indicating that one is selected among the plurality of reduced images 51 also is displayed therein. The cursor 52 is moved so as to select the reduced images 51 in succession by making an operation of rotating the rotation switch 20 shown in FIG. 7. By moving the cursor 52 to a desired reduced image 51 and, for example, operating the decision button 21b (see FIG. 3), an enlarged image of the selected reduced image 51 can be displayed.

To operate the cursor key 21, only a movement of the thumb 32 in the arrow H direction from the position shown in FIG. 7 is required so that the thumb 32 reaches the cursor key 21. Then, by allowing the thumb 32 to operate the cross key 21a and the decision button (see FIG. 3), whereby a menu operation or the like can be carried out.

To operate the third switch 17, as shown in FIG. 6, only a movement of the thumb such that the fingertip of the thumb 32 is moved from the position shown in FIG. 6 slightly upward is required so that the thumb 32 reaches the knob of the third switch 17. Then, by engaging the fingertip of the thumb 32 on the knob of the third switch 17 and turning the third switch 17 around the axis, the drive mode such as single frame shooting mode or burst shooting mode can be selected.

Thus, the third switch 17, the power switch 18, the focus switch 19, and the rotation switch 20 are arranged at positions such that they can be operated without significantly moving the thumb 32. This configuration ensures quick access to each switch to achieve a state ready to operate, thereby improving the operability.

[3-3. Operation with the Index Finger]

The following describes an operation with use of the index finger 33.

First, in the state shown in FIGS. 6 and 7, the index finger 33 is positioned on the release button 14. Therefore, an operation of pressing the release button 14 can be performed directly.

To operate the first switch 15, the index finger 33 is moved from the position shown in FIG. 6 to a position such that the index finger 33 is to be brought into contact with a circumferential surface of the first switch 15 in a substantially cylindrical shape. Then, the fingertip of the index finger 33 is brought into contact with the circumferential surface so as to make an operation of rotating the first switch 15 in the arrow A direction or the arrow B direction (see FIG. 4). With this operation, a shutter speed can be selected. It should be noted that since many minute projections and recesses are formed on the circumferential surface of the first switch 15, friction is generated between the index finger 33 and the circumferential surface during the rotation operation. Therefore, only a small force is required to rotate the first switch 15. The first switch 15 is not necessarily operated with the index finger 33, but may be operated with the thumb 32.

To operate the second switch 16, the index finger 33 is moved from the position shown in FIG. 6 to a position at which the index finger 33 is brought into contact with the knob of the second switch 16. Then, the fingertip of the index finger 33 is engaged on the knob so as to make an operation of rotating the second switch 16 in the arrow A direction or the arrow B direction (see FIG. 4). With this operation, a light metering mode can be selected.

Thus, the release button 14, the first switch 15, and the second switch 16 are arranged at positions such that they can be operated without significantly moving the index finger 33. By so doing, the operability can be improved.

[4. Effects of Embodiment, etc.]

With the image pickup apparatus according the present embodiment, the operation switches that are used frequently during picture taking are arranged at positions such that they can be operated with small movements of the thumb 32 and the index finger 33. By so doing, the operability can be improved.

More specifically, the operation parts placed on the principal face of the main body 1 are arranged at positions such that, in a state in which a user holds the main body 1 with a hand, the operation parts can be operated with the thumb of the hand that holds the main body 1. This configuration improves the operability. This is because in a state in which the main body 1 is held with a hand, only the thumb among the fingers of the hand (usually the right hand) that holds the main body 1 comes on the principal face side. Besides, since the hand (usually the left hand) opposite to the hand holding the main body 1 is used for supporting the lens barrel or the like, it is not easy to operate the operation parts arranged in the principal face of the main body 1 with use of the fingers of the opposite hand. Therefore, the operability is improved by arranging the operation parts at positions such that they can be operated with use of the thumb of the hand holding the main body 1, as in the present embodiment. Further, the knob 18a of the power switch 18, the selection lever 19a of the focus switch 19, and the rotation switch 20 are arranged so as to be projected toward the seventh surface 107 side. In this configuration, to shift the thumb 32 from a stand-by state on the seventh surface 107 to a state of operating the switches, only a slight movement of the thumb 32 is required so that the thumb 32 reaches the switches. Therefore, this configuration ensures quick access to a desired switch, thereby allowing a desired function to be performed quickly.

Further, the disk-shaped rotation operation part (the rotation switch 20) and the rotation operation parts having projected portions (the power switch 18, the focus switch 19, etc.) are arranged with the contact part (the seventh surface 107) being interposed therebetween. This configuration makes it easy to ensure spaces where the rotation switch 20, the power switch 18, and the focus switch 19 are arranged. Besides, the rotation switch 20, the power switch 18, and the focus switch 19 are arranged separately on both sides of the seventh surface 107. This makes it possible to distinguish the operation members easily by the touch. In the present embodiment, the configuration is such that the thumb of the right hand can be brought into contact with the seventh surface 107. Therefore, by allowing the thumb to touch the operation members, the types of the operation members can be distinguished.

Further, the power switch 18 is positioned at an upper right part with respect to the rotation switch 20, when the main body 1 is in a state that a principal face thereof is viewed in a usual way. This configuration requires the thumb to make less pivoting movement when the thumb is moved between the rotation operation parts having knobs and the disk-shaped rotation operation part. Therefore, the operations are facilitated.

Still further, the power switch 18 is provided with a function of switching the power of the image pickup apparatus. This configuration makes it possible to operate the power switching of the image pickup apparatus easily. The disk-shaped rotation operation part (the rotation switch 20) is provided with a function of instructing a movement of the cursor displayed on a display part (the liquid crystal monitor 12, etc.). With this configuration, the operability of the instruction of moving a cursor displayed on the display part can be improved.

Still further, the power switch 18 is provided with a function of turning on the power of the image pickup apparatus when the knob 18a is slid upward, while turning off the power of the image pickup apparatus when the knob 18a is slid downward, when the principal face of the main body 1 is viewed in a usual way. This configuration allows a user to turn on the power of the image pickup apparatus by moving the thumb to the power switch 18 in the state in which the main body 1 is held with hand, and thereafter sliding the knob 18a by one action of flipping the knob 18a. Therefore, the power of the image pickup apparatus can be turned on quickly, and this allows a user to avoid lost shutter chances.

Assume that the image pickup apparatus is configured so that the power thereof is turned on when the knob 18a of the power switch 18 is slid downward. A user, after moving the thumb to the power switch 18 from the state of holding the main body 1, would have to extend the thumb first, and then slide the power switch 18 downward so as to turn on the power of the image pickup apparatus. In other words, the number of actions of the user for turning the power on would increase, and the chances of a lost shutter chance would increase.

The configuration of the present embodiment allows the user to move the thumb smoothly from an action of switching the power from an OFF state to an ON state, to an action of bringing the thumb into contact with the disk-shaped rotation operation part. Therefore, this allows the user to make various setting operations quickly after turning the power on. With this, the start of picture taking by the user also is quickened correspondingly.

Still further, the configuration can be such that the power switch 18 is placed on the right side relative to the seventh surface 107, while the rotation switch 20 is placed on the left side relative to the seventh surface 107. This configuration in which the rotation switch 20 is placed on the left side to the seventh surface 107 allows a rotation operation through 360° or more to be carried out more easily. This allows the joint of the thumb to be bent easily when a rotation operation is carried out with respect to the rotation switch 20, thereby improving the operability.

Still further, the thumb in a stand-by state on the seventh surface 107 is supported on its right side by the edge portion of the sixth surface 106 and the power switch 18, and on its left side by the rotation switch 20 and the tenth surface 110. Therefore, the gripping property can be improved.

Still further, the operation parts that are rotatable and are arranged on the principal face of the main body 1 (the power switch 18, the focus switch 19, and the rotation switch 20) are placed in the vicinity of the seventh surface 107. With this configuration, these operation parts can be operated excellently with the thumb alone. More specifically, in the case where the operation parts arranged on the principal face of the main body 1 are operated in a state in which the main body 1 is held with a hand, they are operated easily by a user if they are arranged so that they can be operated by using the thumb of the hand holding the main body 1. Particularly, the rotation switch 20 is difficult to operate with a finger other than the thumb. Therefore, the rotation switch 20 preferably is placed as nearly at a position such that the switch can be operated by the thumb as possible. In the present embodiment, a rotation operation in a state in which the main body 1 is held with a hand can be performed easily, since the rotation switch 20 is placed in the vicinity of the seventh surface 107.

Still further, the rotation switch 20 is arranged so that half of the same is buried under the tenth surface 110. Therefore, its occupied area on the main body 1 can be reduced, whereby the size of the image pickup apparatus can be reduced.

It should be noted that in the present embodiment, the rotation operation parts include the power switch 18, the focus switch 19, and the rotation switch 20. The rotation operation parts are not limited to the switches described above, but may be any switches as long as at least they are placed at positions facing the seventh surface 107 and can be rotated.

Still further, the rotation switch 20 is configured so as to be rotatable through 360° or more, but another switch included in the rotation operation parts may be formed with a switch that is rotatable through 360° or more. In other words, at least one of the operation parts included in the rotation operation parts may be formed with a switch that is rotatable through 360° or more.

Still further, the rotation switch 20 is formed in a disk shape, but another switch included in the rotation operation parts may be formed in a disk shape. In other words, at least one of the operation parts included in the rotation operation parts may be formed in a disk shape.

Still further, the power switch 18 and the focus switch 19 are formed with switches that are rotatable through predetermined angles, but another switch included in the rotation operation parts may be formed with switches that are rotatable through predetermined angles.

Still further, the focus switch 19 can be placed on an upper right side with respect to the rotation switch 20 when the principal face of the main body 1 is viewed in a usual way.

The present invention relates to an image pickup apparatus with which a picture taking operation can be performed with the right hand, and is useful particularly for a digital still camera, and a digital single-lens reflex camera.

[Appendix 1]

An image pickup apparatus of the present invention is an image pickup apparatus in which an optical image that has entered therein is picked up by an image pickup element and a video signal thereof is obtained, and the image pickup apparatus includes: a cabinet in which the image pickup element is placed; an operation part that is placed on the cabinet and can be operated by a user; a display part that is placed on a principal face of the cabinet and is capable of displaying a video image according to the video signal obtained by the image pickup element; and a contact part placed on the principal face of the cabinet, wherein when the user takes a picture while holding the cabinet, a thumb of a hand of the user is brought into contact with the contact part so that the user holds the cabinet. In the present image pickup apparatus, the operation part includes a plurality of rotation operation parts that are placed in the vicinity of the contact part and are rotatable within a plane substantially parallel with the principal face of the cabinet, any of the plurality of rotation operation parts is arranged so that at least a part of the same faces the contact part, is rotatable through 3600 or more, and is in a disk shape, and another of the plurality of rotation operation parts is arranged so that at least a part of the same faces the contact part, is rotatable through a predetermined angle, and has a projected portion that is projected toward the contact part side.

In this configuration, the operation part is arranged so that when the operation part arranged on the principal face of the camera main body is operated in a state in which the camera main body is held, the operation part can be operated with use of the thumb of a hand holding the camera main body, and hence, this arrangement is easy for the user to operate. This is because in the state in which the camera main body is held, only the thumb among the fingers of the hand (usually the right hand) that holds the camera main body comes on the principal face side. Besides, since the hand (usually the left hand) opposite to the hand holding the camera main body is used for supporting the lens barrel or the like, it is not easy to operate the operation part arranged in the principal face with use of the fingers of the opposite hand. Therefore, the operability for the user is improved by arranging the operation part at a position such that it can be operated with use of the thumb of the hand holding the camera main body.

[Appendix 2]

The image pickup apparatus of the present invention can be configured so that the rotation operation part in a disk shape and the rotation operation part having a projected portion are arranged with the contact part being interposed therebetween.

This configuration makes it easy to ensure spaces where the rotation operation part in a disk shape and the rotation operation part having a projected portion are arranged. Besides, the operation parts are arranged separately on both sides of the contact part. This makes it possible to distinguish the operation parts easily by the touch.

[Appendix 3]

The image pickup apparatus of the present invention can be configured so that the rotation operation part having a projected portion is positioned on an upper right side with respect to the rotation operation part in a disk shape when the principal face of the cabinet is viewed in a usual way.

This configuration allows the thumb to have less movement of the pivot thereof when the thumb is moved between the rotation operation part having a projected portion and the rotation operation part in a disk shape. Therefore, the operations are facilitated.

[Appendix 4]

The image pickup apparatus of the present invention can be configured so that the rotation operation part having a projected portion is provided with a function of switching the power of the image pickup apparatus, and the rotation operation part in a disk shape is provided with a function of instructing a movement of a cursor displayed on the display part.

This configuration facilitates the operation of switching the power of the image pickup apparatus, and also facilitates the operation of instructing a movement of a cursor.

[Appendix 5]

The image pickup apparatus of the present invention can be configured so that the rotation operation part having a projected portion is provided with a function of turning on the power of the image pickup apparatus when the projected portion is turned upward, while turning off the power of the image pickup apparatus when the projected portion is turned downward, when the principal face of the cabinet is viewed in a usual way.

This configuration causes the power of the image pickup apparatus to be turned on when the power switch is rotated upward. Therefore, the user is allowed to turn on the power of the image pickup apparatus by moving the thumb to the power switch from the state of holding the camera main body, and thereafter rotating the switch by one action of flipping the same. Therefore, the power of the image pickup apparatus can be turned on quickly, and this allows the user to hardly let a shutter chance get away.

Assume that the image pickup apparatus is configured so that the power thereof is turned on when the power switch is rotated downward. A user, after moving the thumb to the power switch from the state of holding the camera main body, would have to extend the thumb first, and then rotate the power switch downward so as to turn the power on. In other words, the number of actions of the user for turning on the power of the image pickup apparatus would increase The configuration of the present embodiment allows the user to smoothly move the thumb from an action of switching the power of the image pickup apparatus from an OFF state to an ON state, to an action of bringing the thumb into contact with the rotation operation part in a disk shape. Therefore, this allows the user to quickly make various setting operations after turning on the power of the image pickup apparatus. With this, the time to start picture taking by the user also is shortened correspondingly.

[Appendix 6]

The image pickup apparatus of the present invention can be configured so that the rotation operation part having a projected portion is positioned on a right side to the contact part, and the rotation operation part in a disk shape is positioned on a left side to the contact part.

This configuration in which the rotation operation part in a disk shape is placed on the left side to the contact part allows a rotation operation through 360° or more to be carried out more easily. This allows the joint of the thumb to be bent easily when a rotation operation is carried out, thereby improving the operability for a user.

[Appendix 7]

The image pickup apparatus of the present invention can be configured so that all of the plurality of rotation operation parts are arranged in the vicinity of the contact part.

With this configuration, in the case where the operation parts arranged on the principal face of the camera main body are operated in a state in which the camera main body is held with a hand, the operability for a user can be improved by arranging the operation parts at positions such that they can be operated by using the thumb of the hand holding the camera main body. Particularly, the rotation operation parts are difficult to operate with a finger other than the thumb. Therefore, the rotation operation parts preferably are placed as nearly at positions such that they can be operated by the thumb as possible. In the present invention, a rotation operation on the principal face in a state in which the camera main body is held can be performed easily, since the rotation operation parts are placed in the vicinity of the contact part.

[Appendix 8]

The image pickup apparatus of the present invention can be configured so that at least one of the plurality of rotation operation parts is covered with the cabinet partially.

This configuration reduces areas occupied by the rotation operation parts on the camera main body, thereby reducing the size of the image pickup apparatus.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image pickup apparatus in which an optical image that has entered therein is picked up by an image pickup element and a video signal thereof is obtained, the image pickup apparatus comprising:

a cabinet in which the image pickup element is placed;

an operation part that is placed on the cabinet and can be operated by a user, a display part that is placed on a principal face of the cabinet and is capable of displaying a video image according to the video signal obtained by the image pickup element; and a contact part placed on the principal face of the cabinet, wherein when the user takes a picture while holding the cabinet, a thumb of a hand of the user is brought into contact with the contact part so that the user holds the cabinet, wherein the operation part includes a plurality of rotation operation parts that are placed in the vicinity of the contact part and are rotatable within a plane substantially parallel with the principal face of the cabinet, a first rotation operation part of the plurality of rotation operation parts is arranged so that at least a part of the same faces the contact part, is rotatable through 360° or more, and is in a disk shape, a second rotation operation part of the plurality of rotation operation parts is arranged so that at least a part of the same faces the contact part, is rotatable through a predetermined angle, and has a projected portion that is projected toward the contact part, the first rotation operation part and the second rotation operation part are arranged with the contact part being interposed therebetween, the second rotation operation part is positioned on a right side relative to the contact part when the principal face of the cabinet is viewed from a user's side with the cabinet in an upright position and the first rotation operation part is positioned on a left side relative to the contact part when the principal face of the cabinet is viewed from the user's side with the cabinet in the upright position.

2. The image pickup apparatus according to claim 1, wherein the second rotation operation part is positioned on an upper right side with respect to the first rotation operation part when the principal face of the cabinet is viewed from the user's side with the cabinet in the upright position.

3. The image pickup apparatus according to claim 1, wherein the second rotation operation part is provided with a function of switching the power of the image pickup apparatus, and the first rotation operation part is provided with a function of instructing a movement of a cursor displayed on the display part.

4. The image pickup apparatus according to claim 3, wherein the second rotation operation part is provided with a function of turning on the power of the image pickup apparatus when the projected portion is turned upward, while turning off the power of the image pickup apparatus when the projected portion is turned downward, when the principal face of the cabinet is viewed from the user's side with the cabinet in the upright position.

5. The image pickup apparatus according to claim 1, wherein all of the plurality of rotation operation parts are arranged in the vicinity of the contact part.

6. The image pickup apparatus according to claim 1, wherein at least one of the plurality of rotation operation parts is covered with the cabinet partially.

* * * * *